United States Patent Office 2,909,939
Patented Oct. 27, 1959

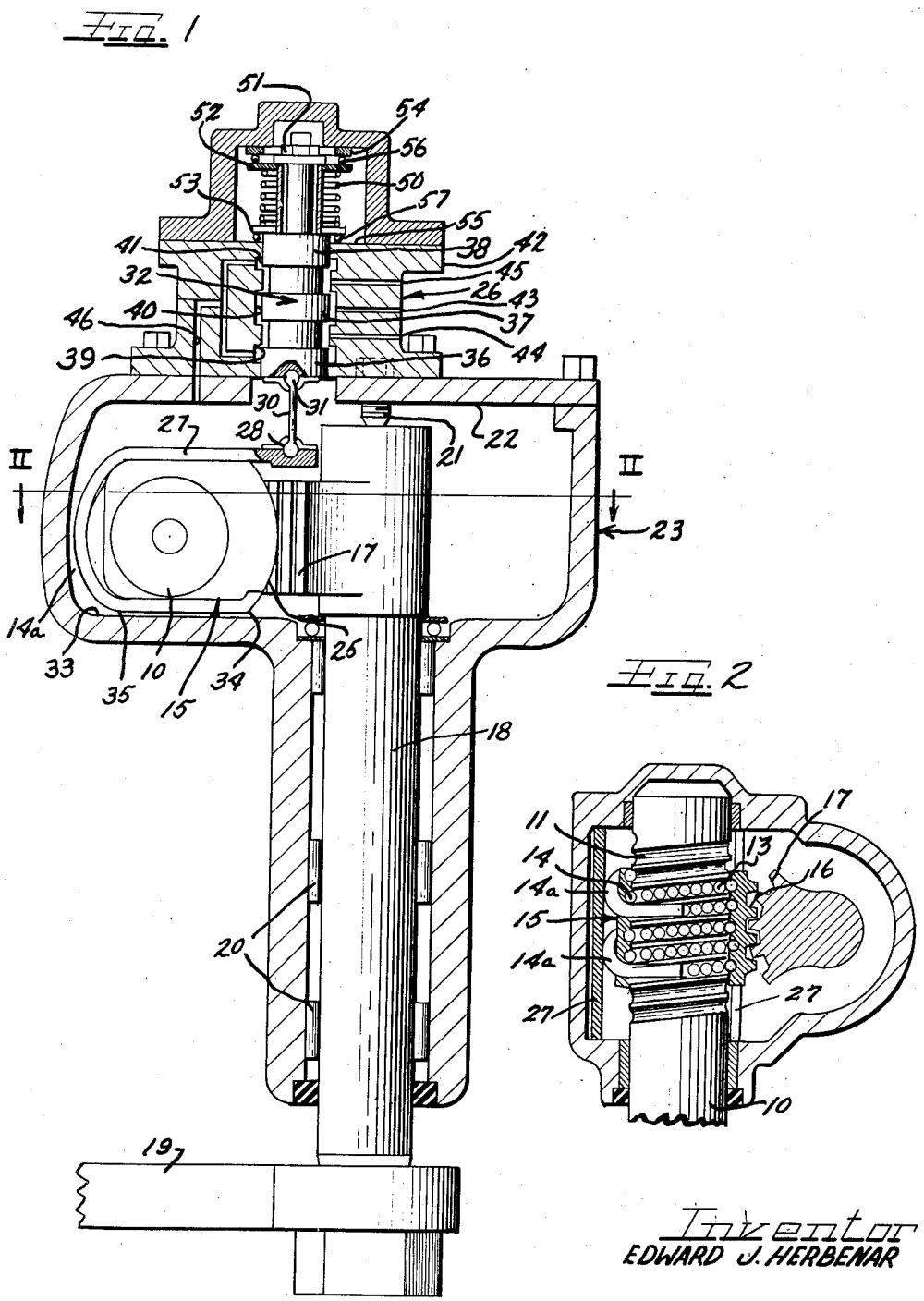

2,909,939
INTEGRAL POWER STEERING SYSTEM

Edward J. Herbenar, Detroit, Mich., assignor to Thompson Ramo Wooldridge Inc., a corporation of Ohio Application June 3, 1955, Serial No. 513,081

2 Claims. (Cl. 74—388)

The present invention relates to power steering apparatus for automotive vehicles and is, more particularly, concerned with the provision of an improved power steering apparatus wherein an anti-friction, recirculating ball, steering reduction gearing is effectively utilized in an integral type power steering apparatus.

As those skilled in the art are aware, numerous power steering systems have been devised. Included among these prior art systems are those arrangements in which the hydraulic power motor and hydraulic motor control valve are separate from the steering column itself, as well as those structures in which at least one of these elements is directly, integrally embodied in the steering column. The present invention comprises an improvement in the latter type of power steering system in which at least the power steering control valve, and also preferably the power motor itself, is physically embodied within the housing of the steering column.

Prior art power steering systems have in some instances utilized the helical connection ordinarily provided between the steering shaft and the cross or rock shaft for purposes of power steering valve actuation. Delicacy of control has, however, been lacking in such systems utilizing a worm and follower between the steering shaft and the cross shaft since the frictional forces are rarely constant throughout the surface of the worm, especially after a period of wear. The present invention contemplates an improved system wherein an anti-friction reduction gearing connection is provided between the steering shaft and the steering gear cross shaft and wherein this anti-friction connection provides a substantially constant reaction force control member for the hydraulic valve of a power steering system in which the valve is positioned for reciprocation by the steering gear cross shaft.

By providing actuation of the power steering control valve by steering gear parts directly associated with the anti-friction ball elements of the steering system extremely sensitive valve actuation is provided, thereby improving the control characteristics of the power steering device at high speeds in the generally straight ahead vehicle position in which very nominal power boost is required to provide all the necessary steering effort. Since power steering accuracy in the straight ahead vehicle condition in which relatively nominal steering loads are imposed has been a serious problem in the industry, the structural relationships herein described have provided a very substantial improvement in over-all power steering performance. This improved performance provides a substantially improved feeling of control in the vehicle operator since, as those skilled in the art are aware, the lack of sensitivity and exactness in power steering systems when traveling in the generally straight ahead position at high speeds has had a disconcerting effect on some of the drivers utilizing such systems.

It is therefore an object of the present invention to provide an improved power steering gear wherein the hydraulic power steering valve is integrally incorporated into the steering column housing and is actuated by steering parts substantially directly associated with the steering shaft through an anti-friction gear reduction.

Still another object of the present invention is to provide a simple yet extremely sensitive and accurate power steering system.

A further object of the present invention is to provide an integral type power steering unit in which the hydraulic power steering valve is actuated by reciprocation of a member moving as a result of reaction forces applied to an anti-friction steering gear ball nut.

A feature of the present invention is the provision of a hydraulic power steering control valve reciprocable along an axis generally parallel to the axis of rotation of the steering gear cross shaft.

Still a further feature of the invention resides in the provision of an anti-friction steering gear ball nut adapted for actuation of a reciprocal power steering valve in cooperation with steering load reaction forces applied to the system at the steering gear cross shaft.

Still a further object of the present invention is to provide a compact, unitized power steering system wherein valve actuation forces are applied within the main steering gear housing and remain evenly constant over the range of steering wheel turn.

Still other and further objects and features of the present invention will at once become apparent to those skilled in the art from a consideration of the attached drawings wherein several modifications of the present invention are shown by way of illustration only and, wherein:

Figure 1 is a cross-sectional view of a vehicular steering column constructed in accordance with the present invention; and Figure 2 is a cross-sectional view of the steering gear apparatus shown in Figure 1 taken along the line II—II thereof.

As shown on the drawings:

As shown in Figures 1 and 2, a steering shaft 10 is provided with a helically grooved worm surface 11 which cooperates with balls 13 freely movable within a confined, endless, complementary worm shaped ball race 14 and tubes 14a in a ball nut 15. The ball nut 15 is provided with an external rack surface 16 which cooperates with a pinion 17 rigidly secured to the steering cross shaft 18 for rotation thereof. As in conventional systems, the cross shaft 18 drives the pitman arm 19 which is in turn connected at its free end to the steering geometry. The cross shaft 18 is mounted for rotation in the conventional bearings 20 and end thrust bearing 21 in the end plate 22 of housing 23.

As may be clearly seen from a consideration of Figure 2, the rack 16 on the ball nut 15 is provided with teeth having perfectly straight faces whereby rotational movement of the ball nut 15 about its own axis has substantially no effect upon the output shaft 18 other than rotation thereof during such times as the ball nut 15 is reciprocating along the shaft 10. The rack 16 is also constructed with an arcuate face 25 on each of the rack teeth so that rotational movement of the rack 16 and ball nut 15 about its own longitudinal axis is permitted.

With the structural relationship above set forth, rotation of the steering shaft 10 against a steering load applied to the pitman arm 19 will cause a load to be applied to the rack 16. This load tends to prevent reciprocation of the rack and in view of the helical recirculating ball connection between the ball nut 15 carrying the rack 16 and the shaft 10, any resistance to reciprocatory movement of the rack 16 will result in a reaction force tending to rotate the reciprocal ball nut 15 about its longitudinal axis. This tendency to rotate is utilized in a simple manner for actuation of the hydraulic control valve 26.

As illustrated in Figure 1, the reciprocating ball nut 15 slides within a U-shaped axially fixed lever plate 27. At its free end, at any convenient axial point thereon, the lever 27 carries a ball and socket connection 28 universally connecting the lever 27 to a reciprocal link 30 which is in turn connected through a universal ball joint 31 to a reciprocal valve core 32. Thus, when the recirculating ball nut 15 rotates in response to the application of a steering load thereto, this rotational movement is imparted to the lever 27 and from thence to the reciprocal core 32 which in turn controls the flow of high pressure fluid to a power steering motor.

In view of the helical nature of the worm 11, steering movements in one direction against a steering load will provide a rotational tendency of the ball nut 15 in a clockwise direction as viewed in Figure 1 while reverse steering movement will cause a rotational tendency in the counterclockwise direction. This tendency on the part of the nut 15 to rotate is controlled by the proximity of the stop surface 33, however, and it will be apparent from a consideration of Figure 1 that the nut 15 is permitted to rotate only a few degrees in either direction before the shoulders 34 or 35 strike the stop surface 33. In the event of a power failure, in which the power steering motor under the control of the reciprocal valve 32 does not provide a power assist, the ball nut 15 will rotate into a position with either the shoulder 34 or shoulder 35 in contact with the abutment stop surface 33 and subsequent rotation of the steering shaft 10 will cause conventional manual power application to the cross shaft 18 and pitman arm 19.

The reciprocal valve illustrated in Figure 1 may be of varying types. However, for purposes of illustration, the valve comprises a reciprocal valve core 32 having three control lands 36, 37 and 38 which cooperate with three annular grooves 39, 40 and 41 in the valve housing generally indicated at 42. The grooves and lands above set forth control fluid flow from a pressure inlet 43 to power steering motor cylinder conduits 44 and 45 as well as to the exhaust conduit 46. For example, when the valve core 32 moves reciprocally downwardly the land 37 closes off the groove 40 from the exhaust groove 39 and permits the flow of pressurized fluid from the conduit 43 to conduit 45. At the same time, the land 38 closes off the exhaust groove 41. With the parts thus positioned pressurized fluid is directed to the power cylinder of the steering booster and through the conduit 45 and the opposite steering motor conduit 44 is permitted to exhaust through groove 39 to the exhaust conduit 46. Preferably, the latter exhaust conduit leads directly into the cavity of the steering column housing thereby providing recirculating fluid flow. In reverse operation, the piston 32 moves upwardly connecting the pressure conduit 43 with the power cylinder conduit 44 and venting the power cylinder conduit 45 to the exhaust conduit 46.

In order to provide a constant centering action, and to prevent power steering assist from the power steering motor until after a predetermined nominal steering torque is applied, a centering spring 50 is secured to the core 32 by means of a bolt 51 and pressure plates 52 and 53. As may be seen, the pressure plates 52 and 53 cooperate with respective housing abutments 54 and 55 such that upward reciprocation of the core 32 will cause the spring 50 to be compressed against the fixed pressure plate 52 while downward movement of the core 32 will cause the spring 50 to be pressed against pressure plate 53 held fixed against downward movement by abutment shoulder 55. Ball bearings 56, 57 permit free movement of core 32 at all times during reciprocation, thereby preventing binding.

As above noted, various types of control may be satisfactorily utilized in the steering gear of the present invention. However, the reciprocable spring centered valve shown has proven extremely satisfactory when utilized with the extremely smooth acting anti-friction recirculating ball nut in a worm valve actuation element. Further, it will of course be understood that substantially a conventional type of power cylinder motor may be utilized in the present invention and may be applied to the vehicle to provide power to the cross shaft 18, the steering shaft 10, or the steering linkage itself at some convenient point between the wheels and the pitman arm 19.

While the reciprocal valve 32 is shown in Figure 1 to reciprocate on an axis substantially parallel to the axis of the cross shaft 18 it will be understood that in instances in which vertical, overhead, space is limited, the housing 23 may be constructed to provide for attachment of the valve housing 26 at substantially any point on the housing 23 around the ball nut 15. Since the actuation of the valve core 32 is by rotational movement of the ball nut 15, the only limitation of the position of the valve is that its axis of reciprocation lie transversely of the axis of rotation of the steering shaft 10 and the ball nut 15 and close enough thereto to permit a lever arm 27 of a practicably short length. This versatility permits the use of the control system of the present invention in substantially any type of automotive vehicle whether or not peculiarities of engine design or the positioning of engine auxiliaries may place rather serious space limitations on the steering column itself. This is an extremely important factor in automotive construction and permits the integration of the control valve into the steering column in a readily accessible demountable manner without interference with other important automotive parts.

In the embodiments shown in Figures 1, and 2, the anti-friction ball nut provides a smooth, substantially constant, steering actuation throughout the entire steering range. This anti-friction relationship, taken with the antifriction mounting of the follower 17a provides a valve control for the transversely moving cross shaft 18a of extreme accuracy. As above explained, this improvement in accuracy has substantially increased the smoothness of power steering operation and prevented erratic power boost when driving in the substantially straight ahead low steering torque condition. Additionally, the improvement in accurate sensitivity in the substantially straight ahead condition has permitted the use of less powerful springs 50, 50a without incurring a feeling of looseness in the system.

It will, of course, be apparent to those skilled in the art that variations and modifications can be made in the above set forth structures without departing from the concepts of the present invention. For example, in place of the U-shaped lever 27 illustrated in Figure 1, a lever may be rigidly secured to the recirculating ball nut 15 and the ball and socket connection 28 may be changed to a T-slot extending longitudinally of the axis of the ball nut 15. Under this arrangement the projection 30 from the valve core 32 would be rigid relative to the valve core and the universal ball housing of the joint 28 would be slidably mounted in the T-slot thereby permitting reciprocatory movements of the ball nut 15 without movement of the valve. Rotation of the lever 27 under such a modified arrangement, of course, still provides reciprocation of the valve core. Further, it will be understood that in view of the fact that rotary motion of the recirculating ball nut 15 in the modification shown in Figures 1 and 2 causes valve actuation, the valve may be positioned at any convenient point so long as the axis of valve movement is transverse to the axis of rotation of the shaft 10.

It will thus be apparent to those skilled in the art that I have provided a simple yet extremely effective improvement in power steering systems by which an important advance in over-all power steering smoothness and sensitivity is achieved. At the same time, an extremely compact power steering control unit is provided in which the hydraulic control valve may be attached to an integral type steering column as an accessory item without difficulty, thereby rendering the steering assembly of the present invention entirely suitable for accessory use with automobiles originally constructed with a steering housing constructed to accept the housing of the reciprocating valve. It will, of course be understood that variations and modifications may be made to the structures hereinabove described without departing from the scope of the novel concepts disclosed. Accordingly, it is my invention that the present invention be limited solely by the scope of the hereinafter appended claims.

I claim as my invention:

1. In a power steering system comprising a steering shaft, a recirculating ball nut mounted for anti-friction reciprocation along said shaft in response to rotation of said shaft, a cross shaft drivingly connected to a steered part and operatively connected to said recirculating ball nut for oscillation thereby when said ball nut reciprocates, a valve reciprocable along an axis transverse to the axis of said steering shaft, and means responsive to the application of an axial steering load on said recirculating ball nut to actuate said reciprocable valve, said means comprising mechanical linkage connecting said recirculating ball nut to said valve to transmit rotary motion of said nut into reciprocation of said valve.

2. In a power steering system comprising a steering shaft, a recirculating ball nut mounted for anti-friction reciprocation along said shaft in response to rotation of said shaft, a cross shaft drivingly connected to a steered part and operatively connected to said recirculating ball nut for oscillation thereby when said ball nut reciprocates, a valve reciprocable along an axis transverse to the axis of said steering shaft, and means responsive to the application of an axial steering load on said recirculating ball nut to actuate said reciprocable valve, said means comprising mechanical linkage connecting said recirculating ball nut to said valve to transmit rotary motion of said nut into reciprocation of said valve and stop means for limiting rotation of said ricirculating ball nut to a relatively small angle whereby manual steering independently of the actuation of said valve is provided in the event of a hydraulic failure.

References Cited in the file of this patent
UNITED STATES PATENTS

| | | |
|---|---|---|
| 2,037,505 | Eaton | Apr. 14, 1936 |
| 2,587,495 | MacDuff | Feb. 25, 1952 |
| 2,605,854 | MacDuff | Aug. 5, 1952 |
| 2,788,671 | Talbot | Apr. 16, 1957 |